United States Patent  [15] 3,678,122
Schmerling  [45] July 18, 1972

[54] ALLYLATION OR BENZYLATION OF AROMATIC COMPOUNDS

[72] Inventor: Louis Schmerling, Riverside, Ill.
[73] Assignee: Universal Oil Products Company, Des Plaines, Ill.
[22] Filed: Oct. 5, 1970
[21] Appl. No.: 78,279

[52] U.S. Cl..................260/671 A, 260/669, 260/671 R, 260/671 C
[51] Int. Cl............................................C07c 3/56
[58] Field of Search............260/671 A, 671 C, 669 R, 671 R, 260/671 P

[56] References Cited

UNITED STATES PATENTS 2,404,235  7/1946  Kharasch..............................260/671
3,251,895  5/1966  Wilkes...................................260/671

Primary Examiner—Curtis R. Davis
Attorney—James R. Hoatson, Jr. and Raymond H. Nelson

[57] ABSTRACT

Aromatic compounds may be allylated or benzylated by treatment with an allylic halide or a benzylic halide in the presence of a copper halide catalyst to form allylated substituted aromatic compounds. The reaction is exemplified by the treatment of benzene with allyl chloride in the presence of copper chloride to form allylbenzene.

10 Claims, No Drawings

ALLYLATION OR BENZYLATION OF AROMATIC COMPOUNDS

This invention relates to a process for the allylation of aromatic compounds and particularly to a process for treating aromatic compounds with an allylic halide in the presence of a copper halide catalyst to form the desired product. Allyl substituted aromatic compounds are useful in the chemical industry, usually as intermediates in the preparation of desirable chemical compounds. For example, allylbenzene may be used as an intermediate in the preparation of oxygen-containing derivatives such as cinnanic acid, cinnanic alcohol or cinnanic aldehyde. These compounds are useful in medicines, perfumes, the aldehyde being particularly used for lilac and other floral scents while the aldehyde is useful in flavors and spice perfumes.

The process of this invention has an advantage over the well-known Frieder-Crafts reaction in the presence of aluminum chloride; for example, the product of the reaction of benzene and allyl chloride in the presence of cupric chloride as a catalyst comprises allylbenzene, whereas the reaction in the presence of aluminum chloride yields β-chloropropylbenzene and diphenylpropane as the products thereof [Nenitzescu and Isacescu, Ber. 66, 1100 (1933)].

It is therefore an object of this invention to provide a process for the allylation or benzylation of aromatic compounds.

A further object of this invention is to provide a process for the allylation or benzylation of aromatic compounds utilizing copper halide as the catalytic means of effecting said reaction.

In one aspect an embodiment of this invention resides in a process for the allylation of an aromatic compound containing at least one replaceable nuclear hydrogen atom which comprises reacting said aromatic compound with an allylic halide in the presence of a copper halide at allylation conditions and recovering the resultant allylated aromatic compound.

A specific embodiment of this invention is found in a process for the allylation of aromatic compounds which comprises reacting toluene with allyl chloride in the presence of cupric chloride at a temperature in the range of from about 40° to about 250° C. and a pressure in the range from about atmospheric to about 100 atmospheres, and recovering the resultant allylated toluene.

Other objects and embodiments will be found in the following further detailed description of the present invention.

As hereinbefore set forth, the present invention is concerned with a process for the allylation of aromatic compounds, the suitable aromatic compounds possessing the generic formula:

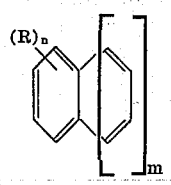

in which R is selected from the group consisting of hydrogen, halogen, hydroxy, alkyl, alkoxy, aryl, alkaryl, arylalkyl, and cycloalkyl radicals, the number of carbon atoms in the radicals being from 1 to about 20, $n$ is an integer of from 1 to 13 and $m$ is a number of from 0 to 2, the only criterion being that the aromatic compounds contain at least one replaceable nuclear hydrogen atom. Suitable examples of these aromatic compounds will include benzene, naphthalene, anthracene, phenol, 1-naphthol, 2-naphthol, 1-anthranol, 2-anthranol, chlorobenzene, bromobenzene, toluene, ethylbenzene, n-propylbenzene, cumene, anisol (methoxybenzene), ethoxybenzene, propoxybenzene, 1-methylnaphthalene, 2-methylnaphthalene, 1-ethylnaphthalene, 2-ethylnaphthalene, 1-n-propylnaphthalene, 2-n-propylnaphthalene, 1-methylanthracene, 2-methylanthracene, 1-ethylanthracene, 2-ethylanthracene, 1-n-propylanthracene, 2-n-propylanthracene, 1-methoxynaphthalene, 2-methoxynaphthalene, 1-methoxyanthracene, 2-methoxyanthracene, 1-ethoxynaphthalene, 2-ethoxynaphthalene, 1-ethoxyanthracene, 2-ethoxyanthracene, 1-propoxynaphthalene, 2-propoxynaphthalene, cyclopentylbenzene, cyclohexylbenzene, cyclopentylnaphthalene, cyclohexylnaphthalene, cyclopentylanthracene, cyclohexylanthracene, p-tolylbenzene, o-tolylbenzene, etc.; di-substituted aromatic compounds including o-xylene, m-xylene, p-xylene, o-diethylbenzene, m-diethylbenzene, p-diethylbenzene, 1,2-dimethylnaphthalene, 1,4-dimethylnaphthalene, 1,2-dimethylanthracene, 1,4-dimethylanthracene, 1,2-dichlorobenzene, 1,2-dibromobenzene, 1,2,3-trichlorobenzene, 1,2,3-tribromobenzene, 1,2-dichloronaphthalene, 1,3-di-chloronaphthalene, 1,4-dichloronaphthalene, 1,2-dichloroanthracene, 1,3-dichloroanthracene, 1,4-dichloroanthracene, 1,2-dihydroxy-benzene(pyrocatechin), 1,3-dihydroxybenzene(resorcinol), 1,4-dihydroxybenzene(hydroquinone), 1,2-dihydroxynaphthalene, 1,3-dihydroxynaphthalene, 1,4-dihydroxynaphthalene, 1,2-dihydroxy-anthracene, 1,3-dihydroxyanthracene, 1,4-dihydroxyanthracene, etc., the corresponding tetra- and penta-substituted benzenes as well as the corresponding tetra-, penta-, hexa-, hepta-, etc., substituted naphthalenes and anthracenes, etc. It is also contemplated within the scope of this invention that other polynuclear aromatic compounds which are non-condensed in nature such as di-phenylmethane, triphenylmethane, diphenylethanes, the corresponding halogen, hydroxy, alkyl, alkoxy, etc., substituted non-condensed aromatic compounds may also undergo allylation by treatment with an allylic halide, although not necessarily with equivalent results. It is to be understood that the aforementioned aromatic compounds are only representative of the class of compounds which may undergo allylation according to the process described herein and that the present invention is not necessarily limited thereto.

The aforementioned aromatic compounds are subjected to a reaction with an allylic or benzylic halide and particularly the chlorides and bromides, although it is contemplated that the corresponding iodides and fluorides of the hereinafter set forth allylic compounds may also be used although not necessarily with equivalent results. Suitable halides which may be used as reactants will include allyl chloride, allyl bromide, methallyl chloride, methallyl bromide, 3-chloro-1-butene, 3-bromo-1-butene, 1-chloro-2-butene, 1-bromo-2-butene, 3-chloro-1-pentene, 3-bromo-1-pentene, 4-chloro-2-pentene, 4-bromo-2-pentene, 3-chloro-1-hexene, 3-bromo-1-hexene, 4-chloro-2-hexene, 4-bromo-2-hexene, 2-chloro-3-hexene, 2-bromo-3-hexene, 3-chloro-1-heptene, 3-bromo-1-heptene, 4-chloro-2-heptene, 4-bromo-2-heptene, 5-chloro-3-heptene, 5-bromo-3-heptene, the corresponding chlorides and halides which are allylic in configuration of the isomeric octenes, nonenes, decenes, undecenes, dodecenes, etc.; halo-substituted allylic halides such as 1,3-dichloropropene, 1,3-dibromopropene, 1,3-dichlorobutene-1, 1,3-dibromobutene-1, 2,4-dichlorobutene-2, 2,4-dibromobutene-2, 1,3-dichloropentene-1, 1,3-dibromopentene-1, 2,4-dichloropentene-2, 2,4-dibromopentene-2, etc. In addition, it is also contemplated that cyclic compounds which contain an allylic or benzylic halide may also be utilized as starting materials in the process of this invention as well as aromatic compounds which also contain the desired configuration. Some specific examples of these compounds will include 3-chloro-1-cyclopentene, 3-bromo-1-cyclopentene, 3-chloro-1-cyclohexene, 3-bromo-1-cyclohexene, benzyl chloride, benzyl bromide, etc.

The conditions under which the reaction of the present process will proceed will include reaction temperatures in the range of from about 40° to about 250° C. and preferably from a range of from 50° to 150° C. and reaction pressures ranging from about atmospheric up to about 100 atmospheres or more, the superatmospheric pressure being afforded, for example, by the introduction of a substantially inert gas such as nitrogen into the reaction zone. The reaction is also effected in the presence of a catalytic composition of matter consisting of a copper halide. In the preferred embodiment of the invention the copper is present in the higher valence state and comprises cupric chloride or cupric bromide. Other suitable non- Friedel-Crafts catalysts which may be used include those halides of metals which are capable of existing in at least two different valence states and will include the chlorides and bromides of mercury, tin, lead, cobalt, molybdenum and manganese, although the use of these compounds may not afford equivalent results.

The process of this invention may be effected in any suitable manner and may comprise a batch or continuous type operation. For example, when a batch type operation is used, a quantity of the reactants comprising the aromatic compound and the allylation agent along with the copper halide catalyst is placed in an appropriate apparatus. When the reaction is to proceed under atmospheric conditions, this apparatus may comprise a flask provided with heating, stirring and reflux means. Alternatively, if the reaction is to proceed under superatmospheric pressure, the apparatus will comprise an autoclave of the rotating or stirring type. The particular reactor is heated to the desired operating temperature and the reaction is allowed to proceed at this temperature (and superatmospheric pressure), if so desired, for a predetermined period of time which may range from 0.5 up to about 10 hours or more in duration. Upon completion of the desired residence time, heating is discontinued, the reactor is allowed to return to room temperature and any excess pressure, if present, is discharged. The reaction mixture is recovered and subjected to conventional means of purification and separation including filtration, washing, drying, extraction, fractional distillation, etc.

It is also contemplated within the scope of this invention that the process may be effected in a continuous manner of operation. When such a type of operation is used, a quantity of the reactants comprising the aromatic compound and the allylation agent consisting of an allylic halide are continuously charged to the reaction zone which is maintained at the proper operating conditions of temperature and pressure, said reaction zone containing the copper halide catalyst. Upon completion of the desired residence time, the reactor effluent is continuously withdrawn and subjected to conventional means of separation whereby the desired allyl-substituted aromatic compound is recovered while the unreacted starting materials are recycled to form a portion of the feed stock. Inasmuch as the catalyst comprising the copper halide is in solid form, it is possible to effect the continuous manner of operation in various ways. One method of effecting the operation is to dispose the catalyst as a fixed bed in the reactor and allow the reactants to pass therethrough either in an upward or downward flow. Another type of operation is the moving bed type in which the catalyst and the reactants are passed through the reactor either concurrently or countercurrently to each other, and the slurry type of operation in which the catalyst is carried into the reactor as a slurry in one or both of the reactants.

The following examples are given to illustrate the process of the present invention which, however, are not intended to limit the generally broad scope of the present invention in strict accordance therewith.

EXAMPLE I

In this example 92 g. (1.0 mol) of toluene and 19 g. (0.25 mol) of allyl chloride along with 35 g. (0.26 mol) of cupric chloride were placed in a round bottom flask provided with heating and refluxing means. The flask was heated to a temperature of 90° C. and maintained in a range of from 90° to 110° C. for a period of 12 hours at atmospheric air pressure. At the end of this time, heating was discontinued and the flask allowed to return to room temperature. The reaction mixture which comprised a dark-amber liquid was separated from the brownish-green powder catalyst. The liquid was treated by conventional means, analysis of the final product showing the presence of a mixture of ortho- and meta-allyltoluenes.

EXAMPLE II

A mixture comprising 120 g. (1.5 mol) of benzene, 40 g. (0.52 mol) of allyl chloride and 36 g. (0.27 mol) of cupric chloride was placed in the glass liner of a rotating autoclave. The autoclave was sealed and nitrogen pressed until an initial operating pressure of 30 atmospheres was reached. Following this, the autoclave was heated to a temperature of 150° C. and maintained thereat for a period of 4 hours, the maximum pressure at this time rising to 70 atmospheres. At the end of the 4 hour period, heating was discontinued and the autoclave allowed to return to room temperature, the final pressure at room temperature being 35 atmospheres. This excess pressure was discharged, the autoclave was opened and the reaction product comprising a dark-amber liquid and brownish-green powder was recovered. The liquid was separated from the catalyst powder by filtration and subjected to conventional means of purification, analysis of the final product disclosing the presence of allylbenzene.

EXAMPLE III

In this example a mixture comprising 134 g. (1.0 mol) of t-butylbenzene, 75 g. (1.0 mol) of allyl chloride and 10 g. (0.15 mol) of cupric chloride was placed in the glass liner of a rotating autoclave. The autoclave was sealed and nitrogen pressed in until an initial operating pressure of 30 atmospheres was reached. The autoclave was then heated to a temperature of 157° C. and maintained at a range of from 157° to 161° C. for a period of 4 hours, the maximum pressure at this temperature reaching 65 atmospheres. At the end of the aforementioned time period, heating was discontinued and the autoclave was allowed to return to room temperature. After cooling, the excess pressure was discharged and the reaction product comprising a dark red-brown turbid liquid and a dark tan catalyst was recovered. The liquid was separated from the catalyst powder by filtration and subjected to conventional means of purification. Analysis of the product disclosed the presence of a mixture of ortho, meta-,and para-allyl-t-butylbenzenes, the para isomer being present in an amount of about 70 percent of the mixture.

EXAMPLE IV

In this example, a mixture comprising 94 g. (1.0 mol) of phenol, 30 g. (0.25 mol) of allyl bromide and 36 g. (0.27 mol) of cupric chloride is placed in the glass liner of a rotating autoclave. The autoclave is sealed and nitrogen pressed in until an initial pressure of 30 atmospheres is reached. Thereafter, the autoclave is heated to a temperature of 150° C. and maintained thereat for a period of 4 hours. At the end of this time, heating is discontinued and the autoclave is allowed to return to room temperature and the excess pressure is discharged. After recovery of the reaction mixture, separation from the catalyst and purification, analysis of the final product will disclose the presence of a mixture of ortho-, meta-, and paraallylphenols.

EXAMPLE V

A mixture consisting of 106 g. (1.0 mol) of naphthalene, 30 g. (0.25 mol) of allyl bromide and 36 g. (0.27 mol) of cupric chloride is placed in the glass liner of a rotating autoclave. The autoclave is sealed and nitrogen pressed in until an initial pressure of 30 atmospheres is reached. The autoclave is then heated to a temperature of 150° C. and maintained thereat for a period of 4 hours. At the end of this time, heating is discontinued, the autoclave is allowed to return to room temperature and the excess pressure which is present is discharged. The autoclave is opened, the reaction product is recovered and separated from the catalyst by filtration. After utilizing conventional means of purification to separate the final product, it is determined by means of analysis that this product comprises allylnaphthalene.

EXAMPLE VI

In this example 60 g. (0.77 mol) of benzene, 33 g. (0.26 mol) of benzyl chloride and 10 g. (0.07 mol) of cupric chloride were placed in a round bottom flask provided with heating and reflux means. The flask was heated to a temperature of 90° C. and maintained thereat for a period of 11 hours at atmospheric air pressure. At the end of this time, heating was discontinued, the flask allowed to return to room temperature and the reaction product was recovered. The product was subjected to conventional means of purification and analysis by means of a gas liquid chromatograph disclosed the presence of diphenylmethane.

I claim as my invention:

1. A process for the allylation or benzylation of an aromatic compound containing at least one replaceable nuclear hydrogen atom which comprises reacting said aromatic compound with an allylic halide or a benzylic halide in the presence of a copper halide at allylation or benzylation conditions and recovering the resultant allylated or benzylated aromatic compound.

2. The process as set forth in claim 1 in which said conditions include a temperature in the range of from about 40° to about 250° C. and a pressure in the range of from about atmospheric to about 100 atmospheres.

3. The process as set forth in claim 1 in which said copper halide is cupric chloride.

4. The process as set forth in claim 1 in which said allylic or benzylic halide is allyl chloride.

5. The process as set forth in claim 1 in which said allylic or benzylic halide is allyl bromide.

6. The process as set forth in claim 4 in which said aromatic compound is benzene and said resultant aromatic compound is allylbenzene.

7. The process as set forth in claim 4 in which said aromatic compound is toluene and said resultant aromatic compound is a mixture of allyltoluenes.

8. The process as set forth in claim 5 in which said aromatic compound is t-butylbenzene and said resultant aromatic compound is a mixture of allyl-t-butylbenzenes.

9. The process as set forth in claim 5 in which said aromatic compound is naphthalene and said resultant aromatic compound is allylnaphthalene.

10. The process as set forth in claim 1 in which said aromatic compound is benzene, said allylic or benzylic halide is benzyl chloride and said resultant aromatic compound is diphenylmethane.

* * * * *